Patented May 11, 1926.

1,584,137

UNITED STATES PATENT OFFICE.

ROBERT W. POINDEXTER, JR., OF LOS ANGELES, CALIFORNIA, ASSIGNOR, BY MESNE ASSIGNMENTS, TO CALIFORNIA CYANIDE COMPANY, INCORPORATED, A CORPORATION OF DELAWARE.

PROCESS OF PRODUCING HYDROCYANIC ACID.

No Drawing. Application filed December 2, 1919. Serial No. 341,993.

This invention relates to the synthesis of hydrocyanic acid by means of the combination, at a high temperature of ammonia with any suitable source of carbon, such as natural gas, or vapors of petroleum or any of its distillation products, and of coal tar or any of its products. The word "ammonia," as used in this specification, is not to be understood as necessarily meaning pure ammonia, but as indicating any material of which ammonia is the principal and active constituent.

I have discovered the proper control of conditions which will yield large and satisfactory quantities of hydrocyanic acid from the aforementioned synthesis. I have discovered that a necessary condition for the carrying out of the process in question, with the obtainment of a satisfactory yield of hydrocyanic acid, consists in very rapidly heating the ammonia used, up to a satisfactory reaction temperature, while in contact with the material or materials used as a source of carbon. This satisfactory reaction temperature varies widely in accordance with the other conditions under which the process is carried out. It should be understood, as has already been indicated, that my discovery is applicable to a wide range of materials, and that the process based thereon may be successfully carried out by the use of a number of different types of apparatus, so long as the essential principle of rapidly heating the ammonia is adhered to. I have found, then, that the proper reaction temperature is dependent on the materials and apparatus used, so that it is not possible to specify any particular temperature which will be satisfactory for each and every case. In general however, a reaction temperature lying between 950° C. and 1450° C. will be satisfactory for any combination of materials and for any type of apparatus. By "reaction temperature" is meant the temperature of the ammonia during the time it is reacting to form hydrocayanic acid. The heating of the ammonia may be carried out in various ways. The ammonia may be mixed or mingled with the source of carbon used and the mixture then heated. Or the heating of the ammonia may be accomplished at the instant of bringing it into contact with the source of carbon used. Or the ammonia may be separately heated immediately before bringing it into contact with the source of carbon. In this latter case, the source of carbon should be at a temperature not lower than the proper reaction temperature at the time that the ammonia is brought into contact with it. No particular one of these three methods is mentioned as being preferred, and any method which will produce the desired result of heating the ammonia with sufficient rapidity is applicable.

It is not to be understood that complete conversion into hydrocyanic acid of all the nitrogen in the ammonia used has been obtained, or necessarily can be obtained. In a number of experiments carried out, I have succeeded in converting, on the average, 70 per cent of the nitrogen taken into the apparatus into nitrogen combined in hydrocyanic acid, while 25 per cent of the ammonia entered was recovered again as ammonia, the remaining 5 per cent being accounted for as decomposition loss. That is, 5 per cent of the ammonia entering was set free as elementary nitrogen. My best results have shown that in cyclic operations I can obtain almost complete conversion of the nitrogen in ammonia to hydrocyanic acid.

By the term "cyclic operations," as above used, I mean the procedure of recovering from the reaction mixture whatever ammonia remains unaltered and then subjecting it a second time to the process, whereby the major portion is converted to hydrocyanic acid, again recovering the unaltered portion from the reaction mixture and so continuing until all of the ammonia is used up. In practice it is obvious that there would be no advantage in differentiating this recovered ammonia from fresh ammonia, and it would be most advantageous to combine it with the regular ammonia supply.

For the purpose of collecting and obtaining hydrocyanic acid from the mixture resulting from carrying out my process, I have found it advantageous to pass the reaction gases through an absorbing tower, or other suitable apparatus, in which they can be exposed to the action of a liquid which has the power to dissolve or absorb hydrocyanic acid. As examples of such liquids, water, alcohol, dilute sulfuric acid, milk of lime, sodium hydroxide solution, etc., may be mentioned. Particles of carbon, which may be present, may be removed by suitable mechanical means, such as filters, bags, settling chambers, electrostatic precipitators, scrubbers, etc., either before or after or at the time of absorbing or dissolving the hydrocyanic acid. In case unaltered ammonia is dissolved or absorbed simultaneously with the hydrocyanic acid, it may be separated therefrom subsequently. Such separation offers no difficulties for the reason that one of the substances to be separated is an acid, while the other is a base, and since both are volatile, either one can be held by a suitable reagent while the other is removed by distillation or other means. I do not mean to indicate that absorption is the only means by which the hydrocyanic acid can be recovered from the reaction mixture; it might be recovered by refrigeration, for instance, either alone or in combination with ammonia as ammonium cyanide. Since hydrocyanic acid is a very volatile substance, it is obvious that refrigeration would be advantageous in conjunction with absorption.

In case a non-alkaline absorbing medium, such as water has been used, the hydrocyanic acid can be obtained therefrom in any desired degree of concentration by means of distillation with suitable fractionating or fractionally condensing apparatus. In case an alkaline absorbing medium has been used, the corresponding cyanide may be obtained as a solid after concentration under proper precautions to prevent decomposition, or the free hydrocyanic acid may be obtained by distillation, after the addition of a suitable acid for the purpose of setting it free.

I do not claim as of my discovery or invention any of the above mentioned methods whereby hydrocyanic acid or cyanides may be recovered or produced from a gas mixture containing hydrocyanic acid. Such methods, and others are already known, and I specify them to show that there is no obstacle in the way of obtaining in a marketable form the hydrocyanic acid which is produced in mixture with other substances according to the synthetic process which I have discovered.

I shall now proceed to describe various types of apparatus which I have found applicable to the carrying out of my process, in order that the method of carrying it out may be made clear and easily understood. The apparatus used in the experiments already cited in paragraph 4 of these specifications consists of a glazed fireclay tube, through which a mixture of ammonia and natural gas is passed. Various proportions may be used; one satisfactory mixture contains approximately 35 per cent by volume of ammonia, the remainder being natural gas. The tube is heated externally by means of a gas fire, the tube being maintained at a temperature considerably above the satisfactory reaction temperature, which is, in this case, approximately 1200°C. Owing to the high temperature of the walls of the tube, the ammonia is brought very rapidly up to the proper reaction temperature while passing through the first part of the tube, and thus the essential condition for a satisfactory yield of hydrocyanic acid is fulfilled. The ammonia should then remain at about the reaction temperature while passing through the remainder of the tube, and thus time for the completion of the reaction to a satisfactory extent is obtained. The total time of heating plus reaction period is in this case in the neighborhood of one second or less. A series of five similar experiments in which the rates of heating were varied, but were in each case slower than in the experiments first mentioned, showed conversions of the ammonia used varying from 45 per cent to 61 per cent and decomposition losses varying from 27 per cent to 39 per cent. This same apparatus operates successfully on various mixtures of ammonia with the vapors of gasoline, kerosene, benzol, turpentine, etc. It will be noted that this type of apparatus exemplifies the heating of ammonia already mixed with carbonaceous material, that being one of the methods of heating mentioned in paragraph three of these specifications.

Another type of apparatus which I have employed consists of a cylindrical shell of fireclay, provided with one opening at the bottom and two openings at, or near, the top. The shell is surrounded with heat-insulating material and enclosed in a steel shell. The method of operating is the following:—

The fireclay shell is completely filled with pieces of coke; the coke is ignited and is brought to incandescence by means of an air blast admitted through the bottom opening. The products of combustion are permitted to escape through one of the top openings, the other one being closed. When a suitable temperature has been reached, the air blast is shut off, the top opening which was open is closed by means of a water sealed cap, and ammonia is admitted through the other top opening. The reaction gases pass out through the bottom opening and are led to an absorbing tower, where the hydrocyanic acid produced is absorbed in a current of cold water flowing in a direction opposite to that of the gas mixture. The liquor obtained from the absorbing tower is acidified with sulfuric acid and distilled. The hydrocyanic acid collects in the distillate, which is redistilled for the production of hydrocyanic acid of commercial strength and purity. The tail liquor contains ammonium sulfate, from which the ammonia is obtained by the addition of calcium oxide or from which ammonium sulfate is obtained.

It will be noted that in this type of apparatus the ammonia is heated at the instant of its contact with the source of carbon used. It may also be conveniently heated in a similar apparatus containing firebrick or other refractory, non-combustible material which refractory material is alternately heated by the combustion of any convenient fuel and used in turn to heat ammonia, plus a source of carbon, mixed and passed over it. This general method of heating has been alluded to in paragraph three.

Another apparatus consists of a fused silica tube filled with pieces of solid material and heated electrically by means of resistance wire wound on its outside. Suitable absorbing apparatus, similar to that already described, is provided.

Another heating device employed consists of a chamber lined with refractory material and surrounded by a steel shell, a layer of heat-insulating material being used between the lining and the steel shell to retain heat. The chamber is filled with pieces of coke or gas carbon, an electric current is passed through these pieces of carbon and they are raised thereby to a temperature sufficiently above that necessary for the synthesis of hydrocyanic acid according to my process to cause the current of ammonia or of ammonia mixed with gas to become very rapidly heated to the proper reaction temperature. Electric arc furnaces are also useful for carrying out my process.

Another method whereby rapid heating can be obtained consists in mixing ammonia with a combustible gas containing carbon and also with oxygen or with air in amount insufficient to combine with all of the carbon present, and then obtaining the necessary temperature by means of the combustion of a part of the fuel present, while leaving sufficient carbon to react with the ammonia to form hydrocyanic acid. This combustion may advantageously take the form of an explosion. The ammonia, alone or in a gas mixture, may also be heated very rapidly by mixing it suddenly with a very highly heated gas.

It should be clearly understood that the carrying out of my invention is not confined to any particular type or kind of apparatus, but that my process consists in the use of any means which will produce the desired result of rapidly heating ammonia used in the synthetic production of hydrocyanic acid. The very fact that my process has been carried out successfully under so many different sets of conditions and in so many types of apparatus, and that a successful yield of hydrocyanic acid could be obtained when, and only when, the ammonia was heated very rapidly shows, in my estimation, that this rapid heating is a necessity for the maximum yield in this particular synthetic process and is therefore of fundamental importance.

I have already referred to the fact that in carrying out my process a portion of the ammonia employed is recovered unaltered.

It is desirable, and may be possible, to further improve the process so that all of the ammonia used shall be directly converted into hydrocyanic acid. It is easy to so conduct my process that no ammonia shall be recovered as such, but hitherto this has always resulted in a larger decomposition loss than occurs when a portion of the ammonia entered is recovered and caused to pass through the apparatus again in the cyclic process already described. The fundamental feature of my process and the feature which is entirely of my discovery is that the maximum yield of hydrocyanic acid combined with the minimum decomposition loss of ammonia can be accomplished by the rapid heating of the ammonia under a great variety of appropriate conditions. An advantage which this fundamental feature gives to my process is the large production capacity which a given unit of apparatus has by virtue of the high speed with which the synthesis is accomplished.

I claim as my invention:

The process of producing hydrocyanic acid from mixtures of ammonia and a hydro carbon in the gaseous phase, which comprises causing the mixture to react at an elevated temperature while it is passing through a heated zone at a rate which precludes substantial reduction in efficiency because of decomposition of the ammonia and reaction products and so that the time during which the mixture remains in the heating zone is approximately one second when the temperature is approximately 1200° C.

In testimony whereof, I have hereunto set my hand at Los Angeles, California, this 26th day of November, 1919.

ROBERT W. POINDEXTER, Jr.